United States Patent Office 2,790,342
Patented Apr. 30, 1957

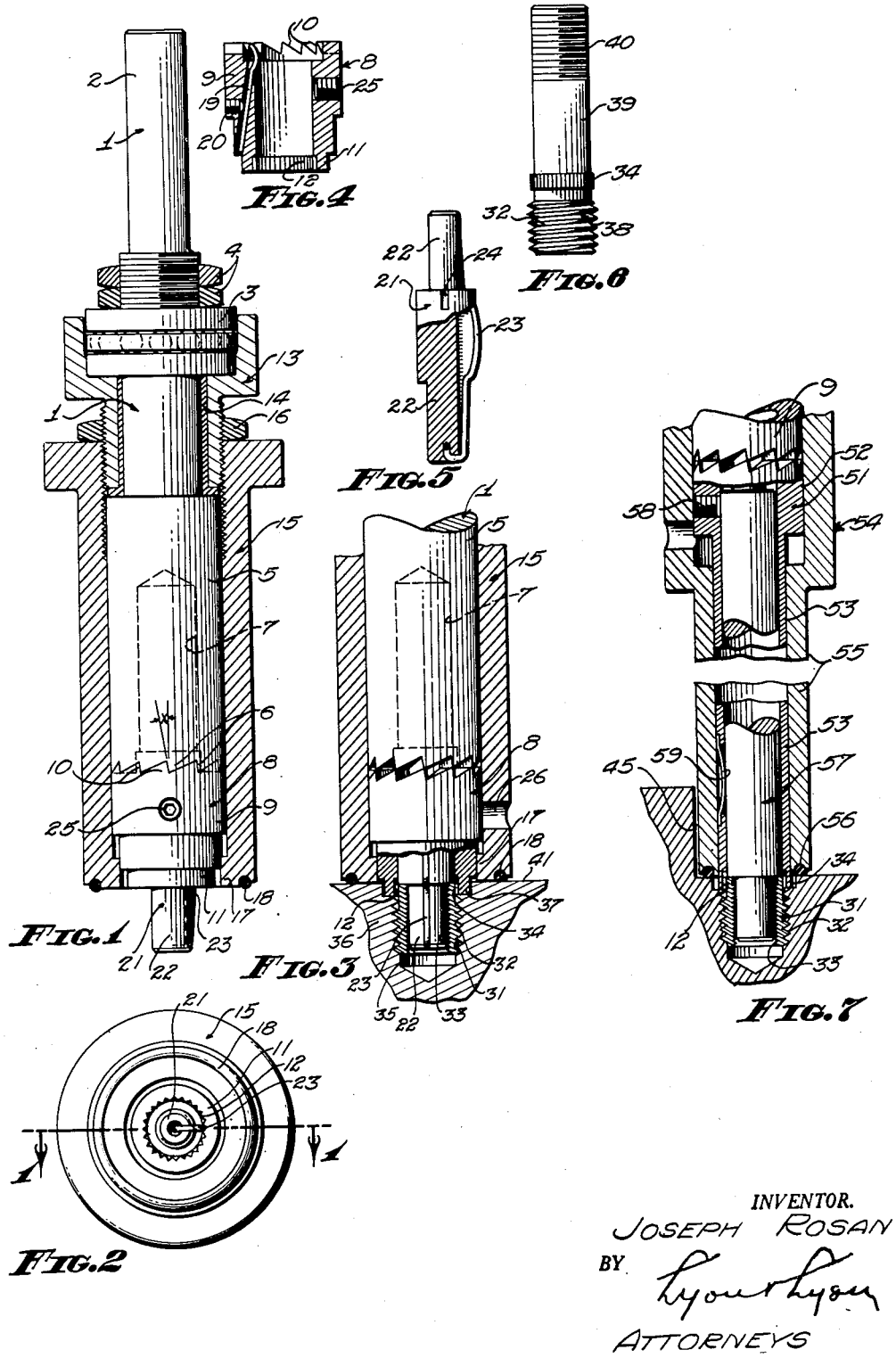

2,790,342

DRIVE TOOL FOR INSERTS

Joseph Rosan, Newport Beach, Calif.

Application February 10, 1955, Serial No. 487,294

13 Claims. (Cl. 81—53)

My invention relates to drive tools for inserts, particularly the type of insert shown in Patent No. 2,400,318 issued May 14, 1946. Such inserts are provided with screw-threaded shanks and an axially serrated end which mates with a serrated locking ring. The insert screw-threads into a socket the depth of which often must be substantially greater than the length of the insert. In any case, accurate control of the socket depth is not feasible. The outer end of the socket is counterbored to receive the locking ring.

It is highly desirable and often mandatory that the outer end of the insert, or outer axial extremity of the serrations if the insert is a stud, and locking ring be flush with the surface of the body of material. For example, if the inserts, whether as internally screw-threaded members or as studs, are employed to join an engine block and head, the mating surfaces of the block and head must be perfectly smooth. Should the inserts and locking rings protrude, however slightly, the head cannot fit properly. If the inserts are too deep, then proper mating of the serrations of the insert and locking ring is impaired. In any case, unless the axial position of the insert can be accurately controlled, proper fit between the members to be joined by the inserts cannot be depended upon.

While many driving tools for conventional studs have been made, the problems involved are quite different from the present case. Frequently, the studs may be driven until they bottom in their previously prepared screw-threaded sockets, a torque-responsive device being arranged to release the stud when it bottoms.

Accordingly, then, included in the objects of my invention are:

First, to provide a drive tool for inserts having axial locking serrations wherein drive connection is maintained with the insert and a special clutch disengages when the insert has been driven an exact predetermined depth.

Second, to provide a drive tool of this type which is particularly adapted for inserts having both axial locking serrations and self-tapping screw-threads.

Third, to provide a drive tool of this class which may be employed for either internally bored or screw-threaded inserts or insert studs.

Fourth, to provide a drive tool of this class which may be secured in a conventional chuck of a portable or fixed drilling machine without other connection therewith.

Fifth, to provide a drive tool of this type having a disengageable drive clutch wherein the insert-holding element of the tool and driven portion of the clutch may have a minimum mass and be particularly free when disconnected from the drive element of the tool and driving portion of the clutch, whereby virtually no coasting or excess driving of the insert occurs when the clutch disengages.

Sixth, to provide a drive tool of this class which is inherently compact and may be especially arranged to permit close placement of studs or inserts without interference.

With the above and other objects in view, as may appear hereinafter, reference is directed to the accompanying drawings in which:

Figure 1 is a partial elevational, partial longitudinal sectional view of my drive tool for inserts, taken through 1—1 of Fig. 2;

Fig. 2 is a bottom end view thereof;

Fig. 3 is a fragmentary, partial elevational, partial sectional view similar to Fig. 1, showing the parts in the position assumed when an insert has been driven to a predetermined depth in a body of material, the insert and body of material being shown in section;

Fig. 4 is a sectional view of the insert holder;

Fig. 5 is a partial elevational, partial sectional view of the pin employed to retain tubular inserts;

Fig. 6 is an elevational view of a stud insert adapted for use with my drive tool;

Fig. 7 is a partial elevational, partial sectional view of a modified form of my drive tool, the parts being shown in the position assumed when the insert has been driven to its final position, the insert and adjacent portions of the surrounding body of material being shown in section.

My drive tool for inserts includes a mandrel 1, the upper end of which is reduced in diameter to form a drive stem 2 adapted for insertion in a conventional chuck of a drill press or other drilling tool, not shown.

Below the stem 2 the mandrel 1 is enlarged in diameter and equipped with a thrust bearing 3, the position of which may be adjusted by nuts 4. The lower end of the mandrel is further enlarged to form a clutch body 5 having clutch teeth 6 formed radially in its lower end. The clutch body is provided with a clearance socket 7, extending upwardly therein from its lower end.

Below the clutch body 5 there is provided a tubular insert holder 8 including a clutch body 9, corresponding in diameter to the clutch body 5, and provided with clutch teeth 10 at its upper end adapted to mate with the clutch teeth 6. The lower end of the tubular insert holder 8 is reduced in diameter to form a tip 11 having internal, axially directed, serrations 12.

Between the thrust bearing 3 and the enlarged clutch body 5 is a sleeve bearing 13, preferably provided with a bearing lining 14. The upper end of the bearing is enlarged and counterbored to receive the thrust bearing 3. The sleeve bearing is rotatably, but snugly, retained between the thrust bearing and a shoulder which forms the upper extremities of the clutch body 5.

The clutch body 5 and insert holder 8 are encased in a sleeve 15, the upper end of which is internally screw-threaded to mate with external screw-threads provided on the sleeve bearing 13. A lock nut 16 permits the sleeve 15 to be adjustably secured relative to the sleeve bearing 13.

The lower extremity of the sleeve 15 is provided with an internal retainer lip 17 which engages the clutch body 9 of the insert holder 8 to limit outward movement thereof. The lower face of the sleeve is provided with an annular groove which receives a bumper ring 18, formed of rubber or other elastomer.

The wall of the insert holder 8 is provided with a small angularly directed bore which supports a stud-retaining spring 19, having an upper end which projects slightly into the central bore of the insert holder. The spring 19 is retained by a set screw 20, all as shown best in Fig. 4.

The insert holder 8 is adapted to receive an insert-retaining pin 21. The ends 22 of the pin 21 are reduced in diameter to fit within tubular inserts, as will be brought out more in detail hereinafter.

The insert-retaining pin 21 is provided with a longitudinal groove in one side in which is fitted a retainer spring 23, the ends of which may hook into the extremities of the retaining pin. Portions of the spring extending along the reduced ends 22 of the retaining pin yieldably project slightly beyond the diameter thereof. The centrally enlarged or body portion of the pin 21 may be provided with a notch 24 which cooperates with the stud-retaining spring 19 when the pin 21 is placed in the insert holder 8, as will be brought out hereinafter. Also, the pin 21 may be retained in place by a set screw 25, accessible through an access hole 26 provided in the sleeve 15.

My drive tool is particularly designed for inserts of the type shown in Patent No. 2,400,318, issued May 14, 1946. The insert therein disclosed may be arranged as a tubular insert with internal screw-threads arranged as a stud insert.

The tubular type of insert designated 31 is shown in Figs. 3 and 7 and comprises external screw-threads 32 and internal screw-threads 33. The upper end of the insert above the external screw threads 32 is provided with axially directed locking serrations 34. The internal serrations 12 of the insert holder 8 are proportioned to fit the locking serrations 34. The insert 31 is intended to be set within a socket 35 formed in a body of material 36. The socket 35 is provided with a counterbore 37 at its outer end. The insert 31 is secured in position by an internally and externally serrated locking ring, not shown, which is broached into the counterbore 37.

If the insert be in the form of a stud, designated 38 and shown in Fig. 6 of the drawings, the external screw-threads 32 and locking serrations 34 are provided as before, but in place of the bore and internal screw-threads a stem 39 projects axially from the locking serrations and is provided with external screw threads 40.

The external screw threads 32 may be arranged for coaction with previously formed screw-threads within the socket 35, or may be specially constructed so as to constitute self-tapping screw-threads, that is, screw threads so arranged that they cut their own screw-threads in the socket 35.

In either case, it is essential, and often necessary, that the axially upper extremities of the locking serrations 34 be flush with the surface 41 of the surrounding body of material 36. If not flush, the axial relation of the serrations to the surface 41 must often be held to close tolerances. Bearing this in mind, operation of my drive tool is as follows:

Assuming first that the tubular insert 31 is to be installed, the retaining pin 20 is placed within the holder 8 and secured. The insert 31 is then slipped on the protruding end 22 until the serrations 34 engage the serrations 12 of the insert holder. This may be done while the mandrel 1 is rotating and irrespective of whether the clutch teeth are in engagement. The insert is then directed into the socket 35.

After the insert 31 is driven into the body of material, the sleeve 15 is brought eventually into engagement with the surface 41, arresting further downward movement of the mandrel 1 and clutch body 5. The insert 31 and insert holder 8, however, continue to move into the body of material, until the clutch teeth 6 and 10 disengage, as shown in Fig. 3. The axial position of the sleeve 15 is accurately adjusted by means of its screw-thread connection with the sleeve bearing 13 and lock nut 16 so that the depth at which the clutch teeth disengage may be predicted with accuracy.

It will be observed from Figs. 1 and 3 that the driving faces of the clutch teeth are disposed at a slight angle, indicated by X. It has been found desirable to provide an angle of approximately 9°. By reason of the angular disposition of the driving faces of the clutch teeth there exists a downward force component, tending to separate the clutch teeth, so that the insert holder 8 is not drawn downward by the insert, but is forced downward as the insert progresses into the socket. By reason of the fact that the angle is small, the downward force is not excessive.

For convenience the reduced ends 22 of the retainer pin 21 may differ in diameter so as to accommodate inserts having different internal diameters.

If the drive tool is employed for installing stud inserts 38, the retaining pin 21 is removed so that the stem 39 of the stud may extend upwardly through the insert holder 8 and if necessary into the clearance socket 7. The stud insert is driven into place in the same manner as the tubular insert.

Reference is now directed to Fig. 7. It will be observed that the diameter of the sleeve 15 is relatively small as compared to the diameter of the insert. However, there is occasion for need of a sleeve even smaller in diameter for the purpose of installing inserts which may be rotated close to a shoulder 45, as shown in Fig. 7. For this purpose an insert holder 51 is provided having a clutch body 52 corresponding in diameter to the clutch body 9.

In the place of the tip 11 a thin-walled tubular stem 53 of any desired length is provided. The lower extremity of the tubular stem is provided with internal serrations 12, as in the first described structure.

In place of the sleeve 15 there is provided a sleeve 54, the upper end of which may be identical to the sleeve 15, but the lower end is provided with an extension 55 of reduced diameter conforming to the tubular stem 53. The lower extremity of the extension 55 is provided with a bumper ring 56.

For the purpose of installing tubular inserts 31, the sleeve 54 receives an insert retaining pin 57 similar to the pin 21 except that it may be elongated so as to extend into the enlarged portion of the drive tool and be secured by a set screw 58. An arcuate retainer spring 59 may be set in the wall of the tubular stem 53.

Operation of the construction shown in Fig. 7 is essentially the same as in the first described structure.

It will be observed that the bumper ring 18 or 56 may be merely an O-ring of relatively small cross-section, and that it need extend only slightly below the sleeve 15 or 54. The principal purpose of the bumper ring is to avoid marring the surface of the material and to act as a brake to stop rotation of the sleeve. It should be observed that the sleeve 15 or 54 is journaled freely by the bearing 13 so that very little force is required to stop the sleeve from rotation when it engages the work surface.

It should be observed that the clutch teeth configuration is such that the insert holder 8 automatically aligns with the clutch body 5 so that the insert holder need not have a close fit or diametrical bearing with the surrounding walls of the sleeve 15.

It should also be observed that although my drive tool is especially suited for the driving of inserts of the type disclosed in my aforementioned patent, the drive tip 12 may be altered to provide various types of conventional drive means.

Having fully described my invention, it is to be understood that I do not wish to be limited to the details herein set forth, but my invention is of the full scope of the appended claims.

I claim:

1. A drive tool for inserts having screw-threads and axially directed locking serrations, comprising: a mandrel having an upper end adapted for connection to a rotary member, and a driving clutch element at its lower end; a bearing including a thrust bearing journaled on said mandrel intermediate its ends; a sleeve suspended from said bearing; means for axially adjusting said sleeve relative to said bearing, thereby to place the lower end of said sleeve in precise axial relation to said driving clutch element; an insert holder freely supported within the lower extended end of said sleeve for relative rotational and axial movement, said holder having a driven clutch element at its upper end movable into and out of engagement with said driving clutch element on axial movement of said holder relative to said sleeve, said holder having internal serrations at its lower end for engagement with the serrations of said insert; and retaining means for engaging and tending to retain said insert relative to said holder and in coaxial relation therewith.

2. A drive tool as set forth in claim 1, wherein: said retaining means includes a bore in said holder to receive a stem forming a part of said insert, and a spring element within the bore of said holder engaging said stem.

3. A drive tool as set forth in claim 1, wherein: said retaining means is a stem protruding from said holder adapted to be received in the bore of a tubular insert, and a spring element bears against the surrounding wall of said insert.

4. A drive tool as set forth in claim 1, wherein: said insert holder is provided with an elongated tubular stem of reduced diameter having said internal serrations at its extended end; and wherein said sleeve has an extended portion of reduced diameter surrounding said tubular stem.

5. A drive tool for inserts having screw-threads and axially directed locking serrations, comprising: a mandrel having an upper end adapted for connection to a rotary member; and a driving clutch element at its lower end; a bearing including a thrust bearing journaled on said mandrel intermediate its ends; a sleeve suspended from said bearing; means for axially adjusting said sleeve relative to said bearing, thereby to place the lower end of said sleeve in precise axial relation to said driving clutch element; an insert holder freely supported within the lower extended end of said sleeve for relative rotational and axial movement, said holder having a driven clutch element at its upper end movable into and out of engagement with said driving clutch element on axial movement of said holder relative to said sleeve, said holder having internal serrations at its lower end for engagement with the serrations of said insert; and retaining means for engaging and tending to retain said insert relative to said holder and in coaxial relation therewith; the lower extremity of said sleeve adapted to engage the surface of material having a socket to receive said insert when said insert enters said socket a depth determined by the axial spacing of the lower end of said sleeve and said driving clutch element; said driving clutch elements having radially disposed clutch teeth, defining drive shoulders mating with corresponding clutch teeth of said driven clutch element and disposed at an angle to the longitudinal axis of said mandrel, whereby said holder tends to follow said insert into said socket upon engagement of said sleeve with the surface of the surrounding body of material and disengage said driven clutch element from said driving clutch element.

6. A drive tool as set forth in claim 5, wherein: said retaining means includes a bore in said holder to receive a stem forming a part of said insert, and a spring element within the bore of said holder engaging said stem.

7. A drive tool as set forth in claim 5, wherein: said retaining means is a stem protruding from said holder adapted to be received in the bore of a tubular insert, and a spring element bears against the surrounding wall of said insert.

8. A drive tool as set forth in claim 5, wherein: said insert holder is provided with an elongated tubular stem of reduced diameter having said internal serrations at its extended end; and wherein said sleeve has an extended portion of reduced diameter surrounding said tubular stem.

9. A drive tool for tubular inserts having screw-threads and axially directed locking serrations, comprising: a mandrel having an end adapted for connection to a rotary member, and an opposite end forming a driving clutch element; a sleeve journaled on said mandrel; an insert holder axially movable in said sleeve below sand mandrel and having a driven clutch element engageable with the driving clutch element and internal serrations at its lower end engageable with the serrations of said insert; and retaining means for engaging and tending to retain said insert relative to said holder and in coaxial relation therewith; said retaining means includes a bore in said holder to receive a stem forming a part of said insert, and a spring element within the bore of said holder engaging said stem.

10. A drive tool for tubular inserts having screw-threads and axially directed locking serrations, comprising: a mandrel having an end adapted for connection to a rotary member, and an opposite end forming a driving clutch element; a sleeve journaled on said mandrel; an insert holder axially movable in said sleeve below said mandrel and having a driven clutch element engageable with the driving clutch element and internal serrations at its lower end engageable with the serrations of said insert; a stem protruding from said holder and adapted to be receivable in the bore of said tubular insert; and a spring element carried by said stem adapted to bear against the surrounding wall of said insert.

11. A drive tool for tubular inserts having screw-threads and axially directed locking serrations, comprising: a mandrel having an end adapted for connection to a rotary member, and an opposite end forming a driving clutch element; a sleeve journaled on said mandrel; an insert holder axially movable in said sleeve below said mandrel and having a driven clutch element engageable with the driving clutch element and internal serrations at its lower end engageable with the serrations of said insert; and retaining means for engaging and tending to retain said insert relative to said holder and in coaxial relation therewith; said insert holder being provided with an elongated tubular stem of reduced diameter having said internal serrations at its extended end and said sleeve having an extended portion of reduced diameter surrounding said tubular stem.

12. A drive tool for screw-threaded devices having drive means, comprising: a mandrel having an end adapted for connection to a rotary member, and an opposite end forming a clutch element; a sleeve journaled on said mandrel; a holder for a screw-threaded device axially movable in said sleeve below said mandrel and having a driven clutch element engageable with the driving clutch element, and drive means at its lower end engageable with the drive means of said screw-threaded device; and retaining means for engaging and tending to retain said screw-threaded device relative to said holder and in coaxial relation therewith, said retaining means including a bore in said holder to receive a stem forming a part of said screw-threaded device, and a spring element within the bore of said holder for engaging said stem.

13. A drive tool for screw-threaded devices having drive means, comprising: a mandrel having an end adapted for connection to a rotary member, and an opposite end forming a clutch element; a sleeve journaled on said mandrel; a holder for a screw-threaded device axially movable in said sleeve below said mandrel and having a driven clutch element engageable with the driving clutch element, and drive means at its lower end engageable with the drive means of said screw-threaded device; and retaining means for engaging and tending to retain said screw-threaded device relative to said holder and in coaxial relation therewith, said retaining means including a stem protruding from said holder adapted to be received in the bore of a tubular screw-threaded device, and a spring element bearing against the surrounding wall of said insert.

References Cited in the file of this patent
UNITED STATES PATENTS

| | | |
|---|---|---|
| 1,030,732 | Jenkins | June 25, 1912 |
| 2,390,515 | Cram et al. | Dec. 11, 1945 |
| 2,637,232 | McKean | May 5, 1953 |
| 2,641,948 | Braendel | June 16, 1953 |
| 2,670,644 | Du Sell | Mar. 2, 1954 |
| 2,686,447 | Vock et al. | Aug. 17, 1954 |
| 2,701,489 | Osborn | Feb. 8, 1955 |
| 2,704,473 | Walther | Mar. 22, 1955 |
| 2,719,445 | Giebler | Oct. 4, 1955 |